United States Patent [19]
Zampese

[11] Patent Number: 6,014,650
[45] Date of Patent: Jan. 11, 2000

[54] PURCHASE MANAGEMENT SYSTEM AND METHOD

[76] Inventor: David Zampese, 9 Southland Rd., Arlington, Mass. 02174

[21] Appl. No.: 08/914,875

[22] Filed: Aug. 19, 1997

[51] Int. Cl.[7] .................................................. G06F 17/60
[52] U.S. Cl. .............................. 705/44; 705/18; 705/40; 235/380; 235/382
[58] Field of Search .................................. 705/18, 14, 30, 705/17, 26, 39, 40, 44, 64, 69, 70, 27, 46; 235/380, 382, 382.5, 381; 395/186; 380/24, 25; 713/202

[56] References Cited

U.S. PATENT DOCUMENTS

| | | | |
|---|---|---|---|
| 4,053,735 | 10/1977 | Foudos | 705/33 |
| 4,450,535 | 5/1984 | De Pommery et al. | 705/41 |
| 4,750,119 | 6/1988 | Cohen et al. | 705/14 |
| 4,941,091 | 7/1990 | Breault et al. | 705/30 |
| 5,430,827 | 7/1995 | Rissanen | 704/272 |
| 5,500,513 | 3/1996 | Langhans et al. | 235/380 |
| 5,557,518 | 9/1996 | Rosen | 705/17 |

*Primary Examiner*—James P. Trammell
*Assistant Examiner*—Mussie Tesfamariam
*Attorney, Agent, or Firm*—Landioro & Teska; Brian J. Colandreo

[57] ABSTRACT

A system and method of implementing a secure purchase management system wherein a unique account code is assigned to a purchaser; a set of secret transaction codes are provided to the purchaser, one secret transaction code to be used for each individual purchase to be made by the purchaser; and each purchase request from a purchaser is verified to make sure it includes the purchaser's account code and a transaction code which has not been used before to thereby prevent unauthorized purchases and fraud.

18 Claims, 2 Drawing Sheets

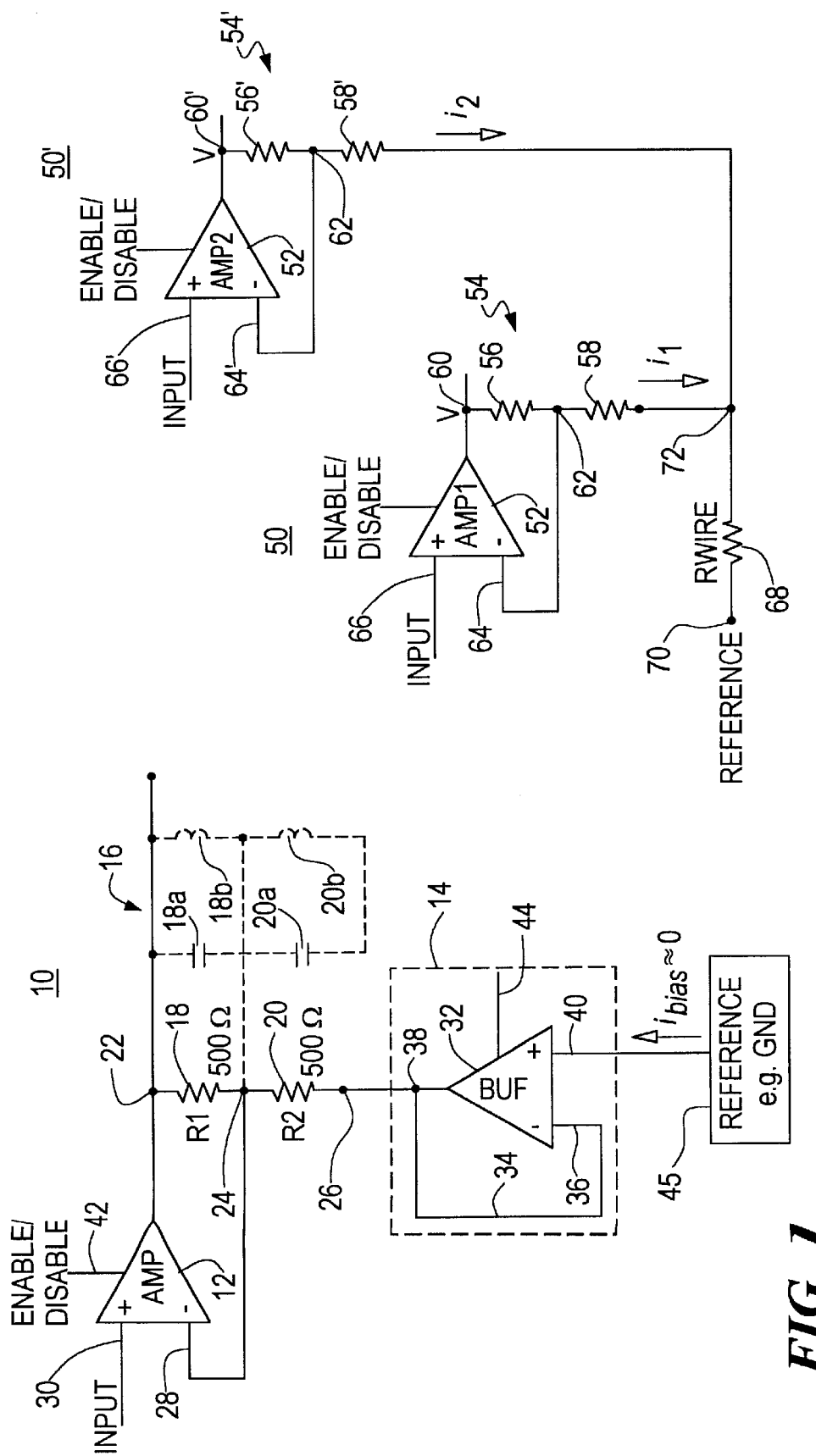

PURCHASE MANAGEMENT SYSTEM AND METHOD

FIELD OF INVENTION

This invention relates to a computerized purchase management system and method of implementing the same for preventing fraud and unauthorized purchases made over computerized networks such as the internet.

BACKGROUND OF INVENTION

The increased use of computerized networks such as the internet during recent years has changed the way commerce is conducted resulting in the advertising of goods and services via retailers' web pages and orders for such advertised goods via a purchase request forwarded to the retailer also placed over the internet. One estimate is that fifty percent of all large retailers now have web sites and retail sales via the internet increased from zero in 1995 to 560 million dollars in 1996.

One problem with this method of conducting commerce is the exchange of currency. If the purchaser is forced to send money in the form of a bank check to the retailer, the speed advantage of order processing via the internet is lost. On the other hand, by its nature, the internet is not a secure communication channel and thus, although some retailers allow the purchase of goods and services using a credit card, it is relatively easy for unauthorized people to steal the purchaser's credit card number and then make unauthorized purchases. And, encryption techniques which attempt to prevent such unauthorized uses of private data including credit card account numbers have been less than successful. In addition, these encryption techniques hamper the goals of fast and convenient commerce conducted over the internet.

SUMMARY OF INVENTION

It is therefore an object of this invention to provide a computerized purchase management system which prevents fraud.

It is a further object of this invention to provide a method of implementing a secure purchase management system.

It is a further object of this invention to provide such a system and such a method which is easy to understand and implement.

It is a further object of this invention to provide such a system and such a method which automatically renders useless any theft or interception of information transmitted from a purchaser to a web page advertiser over the internet.

It is a further object of this invention to provide such a system and such a method which facilitates in the investigation and capture of criminals who steal account numbers.

It is a further object of this invention to provide such a system and such a method which facilitates instead of hampers commerce conducted over the internet.

This invention results from the realization that a truly simple but foolproof purchasing security system can be effected by assigning a unique account identifier to each purchaser and a unique set of secret transaction codes associated with that transaction identifier, each secret transaction code to be used once and only once for a single purchase with that transaction identifier so that each purchase is verified by an account identifier and a secret transaction code to thwart unauthorized charges against that unique transaction identifier. Additional secret transaction codes are added as the secret ones are used up.

A purchaser is provided with an ordered series of secret transaction codes in addition to an account identifier and is instructed that each transaction code is to be only used in order for a single purchase and then never used again. Thus, even if the account identifier and a transaction code is stolen, the thief will be unsuccessful in any attempt to use the stolen transaction code because the account manager can easily verify the fact that the transaction code has already been used. The series of transaction codes as a group are provided to the purchaser in a method external to the internet to prevent unauthorized interception of the transaction codes. Then, since one transaction code is only authorized for use for a single purchase over the internet, the fact that it is wrongfully intercepted or stolen becomes irrelevant since the account manager will not authorize another purchase to be made using the stolen transaction code.

This invention features a method of implementing a secure purchase management system. The method comprises assigning a unique account code to a purchaser; providing a set of secret transaction codes to the purchaser; one secret transaction code for each individual purchase to be made by the purchaser; and verifying that a purchase request from a purchaser includes the purchaser's account code and a transaction code which has not been used before to thereby prevent unauthorized purchases and fraud.

When purchases are made via a computerized network such as the internet, the step of providing the set of unique transaction codes to the purchaser includes supplying the transaction codes to the purchaser via a medium external to the computerized network (e.g., via the mail) to prevent fraudulent interception of the transaction codes. The method preferably also includes the step of checking the purchaser's account balance upon receiving a purchase request. The step of providing secret transaction codes may include the use of a random number generator. The transaction codes are typically in used in order and deleted after use.

The computerized purchase management system of this invention includes means for assigning a unique account code to a purchaser; means for providing a set of secret transaction codes to the purchaser, one transaction code for each individual purchase to be made by the purchaser; a database including the purchaser's account code and secret transaction codes; and means, responsive to the database, for verifying that a purchase request from a purchaser includes the purchaser's account code and a transaction code which has not been used before to thereby prevent unauthorized purchases and fraud.

The database typically further includes the purchaser's account balance and the system further includes means for checking the purchaser's account balance upon the receipt of a purchase request. The means for providing may include a computerized random number generator. The means for verifying preferably includes means for deleting each secret transaction code from the database after they are used by the purchaser.

The plurality of transaction codes typically have an order and the means for verifying includes a routine for ensuring that proper transaction code in the ordered series of transaction codes is present in the purchase request. The database usually includes the purchaser's account balance and further included are means, responsive to a purchase request which includes a purchase amount, for accessing the database and for verifying that the purchase amount is less than the account balance, and means for deleting the transaction code of the purchase request if the purchase amount exceeds the account balance.

DISCLOSURE OF PREFERRED EMBODIMENT

Other objects, features and advantages will occur to those skilled in the art from the following description of a preferred embodiment and the accompanying drawings, in which.

Figures 1, 2:
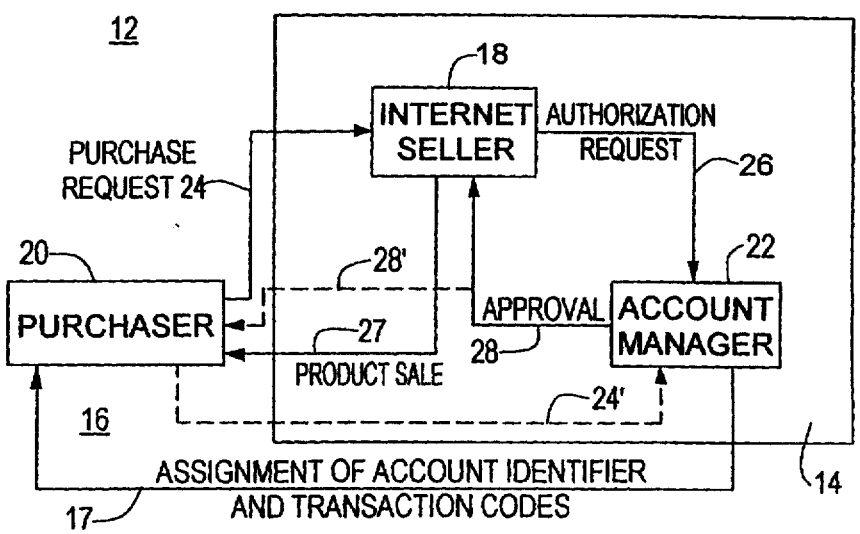
FIG. 1 is a block diagram of the computerized secure purchase management system of this invention.
FIG. 2 is a front view of the purchaser's account card showing the use of the sequential secret transaction codes.

Purchase management system 12, FIG. 1, of this invention includes a computerized network component 14 (i.e. the internet) and a non-computerized network component 16 (i.e. the U.S. mail system, a telephone system, face to face transaction, and the like.) Internet seller 18 typically operates a web page accessible over internet component 14 offering the sale (purchases) of goods or services.

In the prior art, purchaser 20 makes a purchase request by accessing the seller's web page and then transmitting a credit card number via e-mail or the like to internet seller to complete the transaction. As discussed in the Background of the Invention above, however, this channel of communication is not secure and the purchaser's credit card number can be easily intercepted resulting in possible fraud which might not be detected until the credit card is wrongfully used a number of times.

In this invention, however, account manager 22 includes a database including the purchaser's account code, a series of secret transaction codes, and one or more computer programs which access the database which verify the validity of each purchase request and then authorize the purchase request, if valid, in a methodology that prevents the interception of account information and/or renders such fraudulent interception useless to the person who intercepts the information.

The process begins by establishing an account for a potential purchaser, assigning the purchaser account code 30, FIG. 2, and a plurality of secret transaction codes 32–37. In the preferred embodiment, although the account code may be forwarded to the purchaser over the internet, the series of secret transaction codes 32–37 are not. Instead, they are provided to the purchaser via the mail or in person via secure non-internet channel 17, FIG. 1.

The purchaser is instructed to use only the next available transaction code in the ordered series of transaction codes for each purchase and only to use each transaction code 32–37, FIG. 2, once. The transaction codes are ordered but preferably random and unique to each purchaser and may be generated by a computerized random number generator. The account code and the transaction codes, however, may be any combination of numbers, letters, and/or other characters. As shown, the purchaser may be issued a card 40 which includes the purchaser's name 42, account code 30, secret transaction codes 32–37, and column's for the debit amount 44, credit amount 46, and the balance 48. The secure database of the account manager 22, FIG. 1 includes the same information. Note that card 40 could also or instead be represented in a storage device such as a CD ROM or diskette or any other type of storage device. Also, the account code need not be physically separate from the transaction codes and when combined may form a string of digits and/or other characters.

In this invention, purchaser 20 then makes a purchase request to internet seller 18, FIG. 1, as graphically shown over communication line 24. This purchase request includes the purchaser's account code 30 (e.g. 12345), FIG. 2, and a transaction code 32 (e.g. 6789) which has not been used before. Internet seller 18, FIG. 1, then places a request via communication channel 26 to account manager 22. Computer software operating at the site of account manager 22, discussed in more detail with reference to FIG. 3, then accesses the database and verifies the authenticity of the account code and the transaction code, and compares the purchase amount to the purchaser's balance to check the sufficiency of the funds available.

Then, account manager 22, FIG. 1 transmits either an approval or a rejection message internet seller 18 via communication channel 28 who then makes a product sale as shown to the purchaser.

If the transaction code has been used before, or if the transaction code is not the next available transaction code in the ordered series, computer software operating at the site of account manager 22 automatically rejects the authorization request. In this way, even if the transaction code is intercepted, when that transaction code is attempted to be used again, the purchase request will be rejected.

For example, if the purchaser seeks a $50.00 authorization for a purchase using first transaction code 32 (6789), FIG. 2 transmitted over the internet and then makes a $30.00 purchase request using second transaction code 34 (101112), and even if both transaction codes are intercepted, their wrongful use will be detected since they are both automatically deleted from the account manager's database after each purchase is made. The same is true if transaction code 37 is attempted to be used out of order and before the next available transaction code in the ordered series, in this example, transaction code 36.

In an alternative embodiment, purchaser 20, FIG. 1, can seek authorization directly from account manager 22, via communication channel 24'(shown in phantom) and the resulting approval (or denial) is then transmitted back to the internet seller 18 via line 28 and to the purchaser and to purchaser 20 via line 28'. Note that the communication channels shown in FIG. 1 are representative of a number of different internet linkages known in the art such as telephone lines, optical cables, and/or radio frequency or satellite transmissions.

Verification routine 50, FIG. 3 operates on a computer at the site of account manager 22, FIG. 1, in accordance with this invention as follows. Database 52 is established which, for each account holder, includes an account code and the plurality of transaction codes as discussed above. The account codes are for purchase identification purposes and may be generated and assigned to the individual or corporate purchasers by means known in the art similar to assigning a credit card number. In this invention, however, there are also means for providing a series of secret, unique, predetermined, and typically random transaction codes to each purchaser such as a computerized random number generator. Note that this feature of the invention is different from assigning a single personal identification number (PIN) or password that can be wrongfully intercepted when transmitted over the internet and then used to defraud the purchaser and/or creditors.

Database 52 includes the account numbers and transaction codes assigned to each purchaser as well as the account balance. The account balance reflects the debits made and the credits forwarded to the account manager as is common in such transactions.

When a purchase requests is received at account manager 22, step 54, it will include an account code, a transaction code, and a request amount (e.g. number 30, FIG. 2, transaction code 32, and a $50.00 request amount). Verification routine 50 then accesses database 52 and verifies the validity of the account code, step 56, FIG. 3. If the account code is not valid, a reject message is generated and transmitted, steps 58 and 60.

If the account code is valid, the transaction code is verified, step 62. In this step, the account holder's next available transaction code is compared with the transaction code received in the request since all previous transaction codes will have been automatically deleted as discussed below. Also verified in step 62 is the fact that the next available transaction code in the ordered series of transaction codes is being correctly used.

If the account code is not valid, a reject message is generated and transmitted, step 64 and 66. At this stage, an investigation may be undertaken in an attempt to locate the wrongful user of the stolen transaction code.

If the transaction code is valid, then the sufficiency of the funds available may be checked, step 68, and if so an approval message generated and transmitted, step 70. The amount authorized is then automatically debited from the balance in database 52, step 72 and the transaction code used for that purchase is automatically deleted from database 52, step 74 to prevent its authorized re-use as discussed above. The transaction code may also be deleted if there is an indication of insufficient funds, step 76, in a like fashion. A rejection message is then generated, step 77 and transmitted, step 79.

Thus, the purchaser is forced to use the next available transaction code in the ordered series of transaction codes stored in the database and any attempt to use the different transaction code in the sequence or an transaction code which has been used before will result in an automatic rejection, step 62. In this way, since only the purchaser knows all the transaction codes and which transaction codes have been used before and since the transaction codes are provided to the purchaser in a secure fashion and not over the internet, then even if a transaction code is intercepted when it is transmitted over the internet to make a purchase, unlike a pin number or a password, its use will not generate a purchase approval. The result is a secure internet purchase management system and method which facilitates the use of the internet to conduct commerce.

Figure 3:
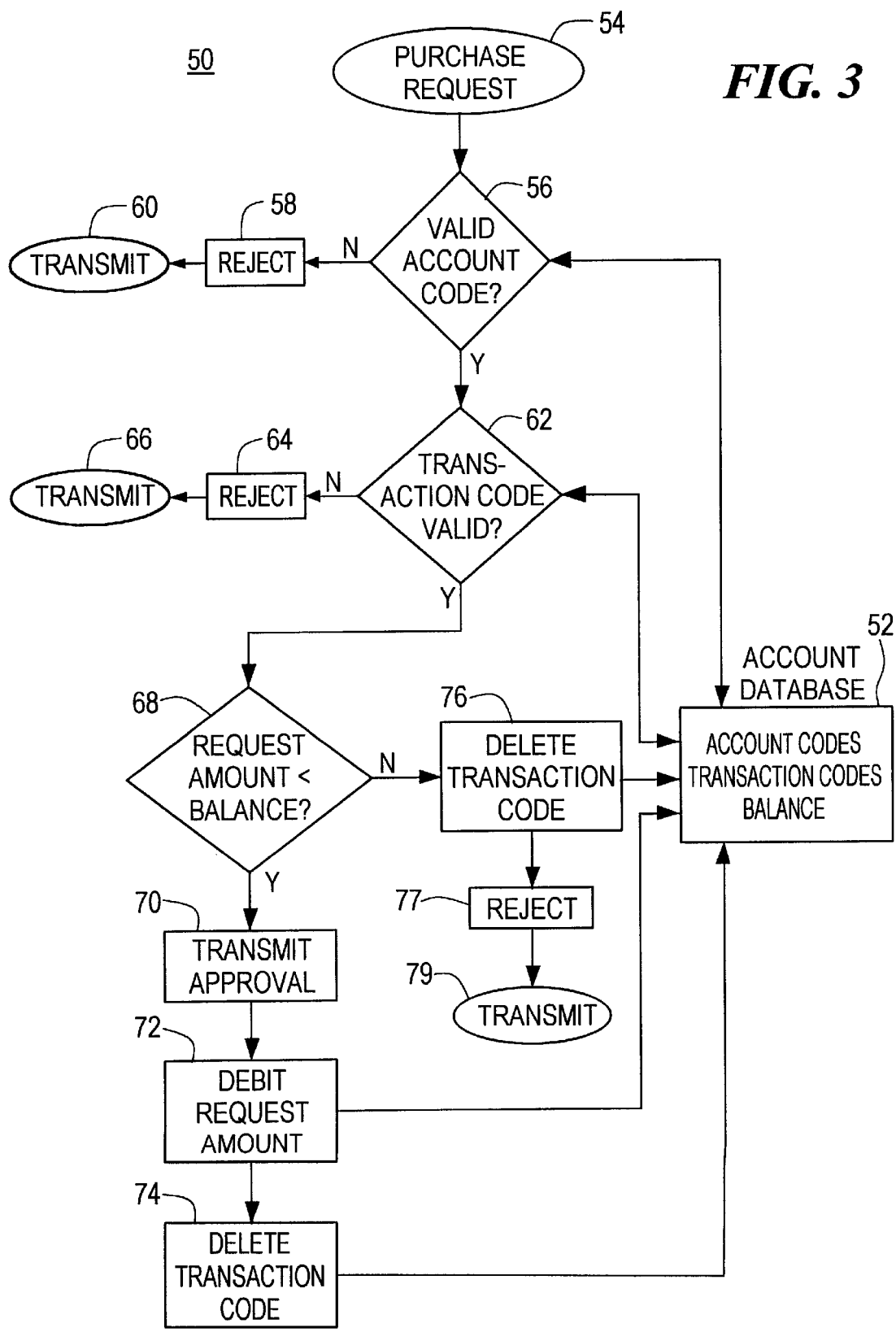
FIG. 3 is a flow chart depicting the operation of the computerized verification routines of the subject invention.

One example of programming useful for implementing routine 50, FIG. 3 is attached hereto as exhibit A.

Although specific features of this invention are shown in some drawings and not others, this is for convenience only as each feature may be combined with any or all of the other features in accordance with the invention. Other embodiments will occur to those skilled in the art and are within the following claims:

What is claimed is:

1. A method of implementing a secure purchase management system, the method comprising:

assigning a unique account code to a purchaser;

providing a set of secret transaction codes to the purchaser, one secret transaction code for each individual purchase to be made by the purchaser; and verifying that a purchase request from a purchaser includes the purchaser's account code and a transaction code which has not been used before to thereby prevent unauthorized purchases and fraud.

2. The method of claim 1 in which purchases are made via a computerized network and the step of providing the set of unique transaction codes to the purchaser includes supplying the transaction codes to the purchaser via a medium external to the computerized network to prevent fraudulent interception of the transaction codes.

3. The method of claim 2 in which the transaction codes are sent to the purchaser via the mail.

4. The method of claim 1 further including the step of checking the purchaser's account balance upon receiving a purchase request.

5. The method of claim 1 in which the step of providing secret transaction codes includes generating random numbers to be provided to be purchaser.

6. The method of claim 1 in which the step of providing secret transaction codes includes providing a series of transaction codes to the purchaser to be used in order.

7. The method of claim 6 further including the step of deleting a transaction code after it is used by the purchaser.

8. A computerized purchase management system comprising:

means for assigning a unique account code to a purchaser;

means for providing a set of secret transaction codes to the purchaser, one transaction code for each individual purchase to be made by the purchaser;

a database including the purchaser's account code and secret transaction codes; and means, responsive to the database, for verifying that a purchase request from a purchaser includes the purchaser's account code and a transaction code which has not been used before to thereby prevent unauthorized purchases and fraud.

9. The system of claim 8 in which the database further includes the purchaser's account balance, the system further including means for checking the purchaser's account balance upon the receipt of a purchase request.

10. The system of claim 8 in which the means for providing includes a computerized random number generator.

11. The system of claim 8 in which the means for verifying includes means for deleting each secret transaction code from the database after they are used by the purchaser.

12. A computerized purchase verification system comprising:

a database including a purchaser's unique account code and a plurality of transaction codes;

means, responsive to a purchase request which includes an account code and one transaction code, for accessing the database and for verifying the validity of the account code and the validity of the transaction code; and means for deleting the one said transaction code to prevent unauthorized purchasers and re-use of that transaction code.

13. The system of claim 12 in which the plurality of transaction codes have an order.

14. The method of claim 13 in which the means for verifying includes a routine for ensuring that proper transaction code in the ordered series of transaction codes is present in the purchase request.

15. The system of claim 12 further including a computerized random number generator for generating said transaction codes.

16. The system of claim 12 in which the database further includes the purchaser's account balance.

17. The system of claim 16 further including means, responsive to a purchase request which includes a purchase amount, for accessing the database and for verifying that the purchase amount is less than the account balance.

18. The system of claims 17 further includes means for deleting the transaction code of the purchase request if the purchase amount exceeds the account balance.

* * * * *

UNITED STATES PATENT AND TRADEMARK OFFICE
CERTIFICATE OF CORRECTION

PATENT NO. : 6,014,650
DATED : January 11, 2000
INVENTOR(S) : David Zampese

It is certified that error appears in the above-identified patent and that said Letters Patent is hereby corrected as shown below:

Replace the first drawing sheet with the attached drawing sheet.

Signed and Sealed this

Fourth Day of September, 2001

*Attest:*

*Attesting Officer*

NICHOLAS P. GODICI
*Acting Director of the United States Patent and Trademark Office*